(12) United States Patent
Wang et al.

(10) Patent No.: US 8,295,340 B2
(45) Date of Patent: Oct. 23, 2012

(54) MINIMUM MEAN SQUARE ERROR EQUALISER WITH REDUCED COMPLEXITY

(75) Inventors: Zhaocheng Wang, Stuttgart (DE); Richard Stirling-Gallacher, Stuttgart (DE)

(73) Assignee: Sony Corporation, Tokyo (JP)

( * ) Notice: Subject to any disclaimer, the term of this patent is extended or adjusted under 35 U.S.C. 154(b) by 909 days.

(21) Appl. No.: 12/327,205

(22) Filed: Dec. 3, 2008

(65) Prior Publication Data

US 2009/0219981 A1   Sep. 3, 2009

(30) Foreign Application Priority Data

Feb. 29, 2008 (EP) ..................................... 08152159

(51) Int. Cl.
*H03H 7/30* (2006.01)
(52) U.S. Cl. .......... 375/229; 375/230; 375/232; 333/18; 381/103; 708/323
(58) Field of Classification Search .................. 375/229, 375/230, 232; 333/18, 28; 381/103; 708/323
See application file for complete search history.

(56) References Cited

U.S. PATENT DOCUMENTS

| | | | | |
|---|---|---|---|---|
| 2002/0057734 A1* | 5/2002 | Sandberg et al. | ............. | 375/222 |
| 2003/0099311 A1* | 5/2003 | Klingenbrunn et al. | ...... | 375/341 |
| 2003/0223489 A1 | 12/2003 | Smee et al. | | |

FOREIGN PATENT DOCUMENTS

| | | |
|---|---|---|
| CN | 1659840 A | 8/2005 |
| EP | 1 152 549 A1 | 11/2001 |
| WO | WO 01/48966 A1 | 7/2001 |

OTHER PUBLICATIONS

Stefan Kaiser, "On the Performance of Different Detection Techiques for OFDM-CDMA in Fading Channels", IEEE, 1995, pp. 2059-2063.

Chinese Office Action issued Sep. 21, 2011, in Patent Application No. 200910117969.6.

* cited by examiner

*Primary Examiner* — Zewdu Kassa
(74) *Attorney, Agent, or Firm* — Oblon, Spivak, McClelland, Maier & Neustadt, L.L.P.

(57) ABSTRACT

The present invention relates to the field of communication devices, e.g. wireless communication devices. More particularly, the present invention relates to the field of signal equalization, especially minimum mean square error equalization. The present invention especially relates to an equalizer for a communication device, a method of equalizing one or more received signals and a software program product for carrying out the method. The present invention reduces the size of a look-up table needed for a division operation and, generally, provides for a reduced complexity of the equalizer and receiver. The equalizer for a communication device comprises a filter calculator for determining a channel power value based on one or more channel response values and selecting one of two or more equalizer structures based on said channel power value and based on at least one threshold value for separating the channel power values into at least two ranges; and a filter for equalizing one or more received signals according to the selected equalizer structure. Advantageously, at least one of said equalizer structures corresponds to an, at least approximated, minimum mean square error equalizer structure or to an, at least approximated, suboptimal minimum mean square error equalizer structure.

22 Claims, 3 Drawing Sheets

MINIMUM MEAN SQUARE ERROR EQUALISER WITH REDUCED COMPLEXITY

FIELD OF THE PRESENT INVENTION

The present invention relates to the field of communication devices, e.g. wireless communication devices. More particularly, the present invention relates to the field of signal equalization, especially minimum mean square error equalization. The present invention especially relates to an equalizer for a communication device, a method of equalizing one or more received signals and a software program product for carrying out the method.

BRIEF DESCRIPTION OF THE PRIOR ART

Minimum Mean Square Error (MMSE) equalizers are well known means to improve the performance of a communication system. MMSE equalizers are known to minimize the error power which is due to inter-symbol interference (ISI) and noise.

Equalizers are employed in the frequency domain and in the time domain and may be accordingly classified as frequency domain equalizers (FDE) or time domain equalizers (TDE). Single tap equalizers are directly applicable for equalization in the frequency domain. Multi tap equalizers are directly applicable in the time domain. However, equalization in the time domain may also be based on a single tap equalizer and equalization in the frequency domain may also be based on a multi tap equalizer.

Single-carrier (SC) and multi-carrier (MC) communication systems are well known. MC systems can be implemented using, for example, but not exclusively, orthogonal frequency division multiplexing (OFDM), multi-carrier code division multiple access (CDMA), wavelet based multi-carrier techniques, OFDM-CDMA and other combinations and variations thereof. In MC systems, traditionally, but not necessarily, equalization is performed in the frequency domain.

Traditionally, communication channels with a single input and a single output (SISO communication systems) were employed, in recent times however, communication channels with multi inputs and/or multiple output have enjoyed a widespread use, which leads the notion of MISO, SIMO and MIMO communication systems.

To implement a conventional MMSE equalizer, a division (or inversion) operation is required. Given for example the conventional single tap, SISO, MMSE equalizer, which performs equalization of a received signal by multiplying the received signal with a factor g which is defined by $$g = \frac{h^*}{|h|^2 + \sigma_n^2}, \qquad (0)$$

whereby $\sigma_n^2$ represent the noise variance, h represents the channel response and * denotes complex conjugation, the dividend h* has to be divided by the divisor $|h|^2 + \sigma_n^2$. In order to reduce the computational complexity, the division operation may be implemented deploying a look-up table (LUT). Hereby, the inverse of the divisor is taken from the LUT and the division operation is replaced by the (computationally less complex) multiplication of the dividend with the inverse of the divisor. This, however, introduces the problem that the look-up table has to be very large in order to cope with the large dynamic range of the channel responses and the noise variances.

S. Kaiser, "On the performance of Different Detection Schemes for OFDM-CDMA in fading channels", IEEE International Conference on Communications (ICC '1995), vol. 3, pp. 1722-1726, Seattle, USA June 1995 discloses a plurality of OFDM-CDMA equalizer structures including a controlled equalization and a MMSE equalization. In the controlled equalization according to Kaiser, one of two equalizer structures is selected depending on the received signal power, which results improved zero forcing (ZF) equalizer. In the MMSE equalization according to Kaiser, the signal-to-noise ratio (SNR) parameter is set to a fixed value, which results in a suboptimal MMSE equalizer.

The problem to be solved by the present invention is to provide for an equalizer, communication device and method for equalizing one or more received signal with reduced complexity and a corresponding software program product.

SUMMARY OF THE INVENTION

This problem is solved by an equalizer for a communication device comprising a filter calculator for determining a channel power value based on one or more channel response values and selecting one of two or more equalizer structures based on said channel power value and based on at least one threshold value for separating the channel power values into at least two ranges; and a filter for equalizing one or more received signals according to the selected equalizer structure.

Advantageously, said filter calculator is adapted to select a first equalizer structure in case said channel power value is below a first threshold value and to select a second equalizing structure in case said channel power value is above said first threshold value.

In a first embodiment of the equalizer, said filter calculator, in accordance with said first equalizer structure, is advantageously adapted to calculate a first product of the conjugate complex of a channel response value with the inverse value of a noise variance value. Advantageously, said filter calculator, in accordance with said second equalizer structure, is adapted to calculate a second product of the conjugate complex of a channel response value with the inverse value of the sum of said channel power value and said noise variance value. Advantageously, said filter calculator is adapted to calculate said first product based on a first look-up table and said second product based on a second look-up table, said first and second look-up tables having different quantisations.

In a second embodiment of the equalizer, the equalizer advantageously comprises a memory for storing a predetermined value and said filter calculator, in accordance with said first equalizer structure, is adapted to calculate a first product of the conjugate complex of a channel response value with either said predetermined value or the inverse value of said predetermined value. Advantageously, said filter calculator, in accordance with said second equalizer structure, is adapted to calculate the sum of said channel power value with either said predetermined value or the inverse of said predetermined value and to calculate a second product of the conjugate complex of a channel response value with the inverse of said sum. Said predetermined value or its inverse may, for example, correspond to a maximum value of a SNR or a minimum value of a noise variance.

Advantageously, said filter calculator is adapted to select a third equalizer structure in case said channel power value is above a second threshold value that is larger than said first threshold value and to select said second filter structure in case said channel power value is above said first threshold value and below said second threshold value. In this case, said filter calculator, in accordance with said third equalizer structure, is advantageously adapted to calculate a third product of the conjugate complex of a channel response value with the inverse value of said channel power value based on a look-up table.

The equalizer according to the present invention may be employed in a MIMO communication device. Advantageously in this case, said channel power value is the largest element of a channel power matrix. Advantageously, said filter calculator is adapted to calculate said channel power matrix by multiplying the Hermitian transpose of a channel matrix with the channel matrix, whereby said channel matrix comprises said one or more channel response values.

In a fourth embodiment of the equalizer, said filter calculator, in accordance with said first equalizer structure, is advantageously adapted to calculate a first matrix corresponding to the Hermitian transpose of said channel matrix multiplied by the inverse of a noise variance value. Advantageously, said filter calculator is adapted to calculate the inverse value of said noise variance value using a look-up table.

In a fifth embodiment of the equalizer, the equalizer advantageously comprises a memory for storing a predetermined value, whereby said filter calculator, in accordance with said first equalizer structure, is adapted to calculate a first filter matrix corresponding to the Hermitian transpose of said channel matrix multiplied by either said predetermined value or the inverse of said predetermined value. Advantageously, said filter calculator, in accordance with said second equalizer structure, is adapted to calculate a second matrix corresponding to a conventional minimum mean square error equalizer matrix whereby the value of a noise power parameter required for calculating said second filter matrix is set to said predetermined value.

In an embodiment, the equalizer advantageously comprises at least two look-up tables for implementing corresponding at least two division or inversion operations, said at least two look-up tables having a different quantization. Advantageously, each of said division or inversion operations corresponds to a different one of said equalizer structures.

Advantageously in case of said second and fifth embodiment of the equalizer, said first threshold value is given by the product of a first factor with said noise variance value.

Advantageously, at least one of said equalizer structures corresponds to an, at least approximated, minimum mean square error equalizer structure or to an, at least approximated, suboptimal minimum mean square error equalizer structure.

The problem is further solved by a communication device comprising an equalizer according to the present invention.

The problem is further solved by a method of equalizing one or more received signals comprising the steps of determining a channel power value based on one or more channel response values; selecting one of two or more equalizer structures based on said channel power value; and equalizing said one or more received signals according to the selected equalizer structure. Hereby, at least one of said equalizer structures corresponds to an, at least approximated, minimum mean square error equalizer structure or to an, at least approximated, suboptimal minimum mean square error equalizer structure; According to the method a first equalizer structure is selected in case said channel power value is below a first threshold; and a second equalizer structure is selected in case said channel power value above said second threshold.

The problem is further solved by a software program product which, when executed in a processing device, is adapted to carry out the method of equalizing one or more received signals according to the present invention.

BRIEF DESCRIPTION OF THE DRAWINGS

Same reference numerals, even when used in different Figures or in relation to different embodiments, relate to the same elements.

DESCRIPTION OF THE PREFERRED EMBODIMENTS

The present invention proposes new and inventive implementations of the MMSE equalization principle which reduce the size of the LUT needed for the division operation and, generally, provides for a reduced complexity of the equalizer and receiver. In the embodiments described in the following, various MMSE and sub-optimal MMSE equalizer implementations are provided in which one from two or three equalizer structures is selected depending on the power of a received signal.

Figure 1:
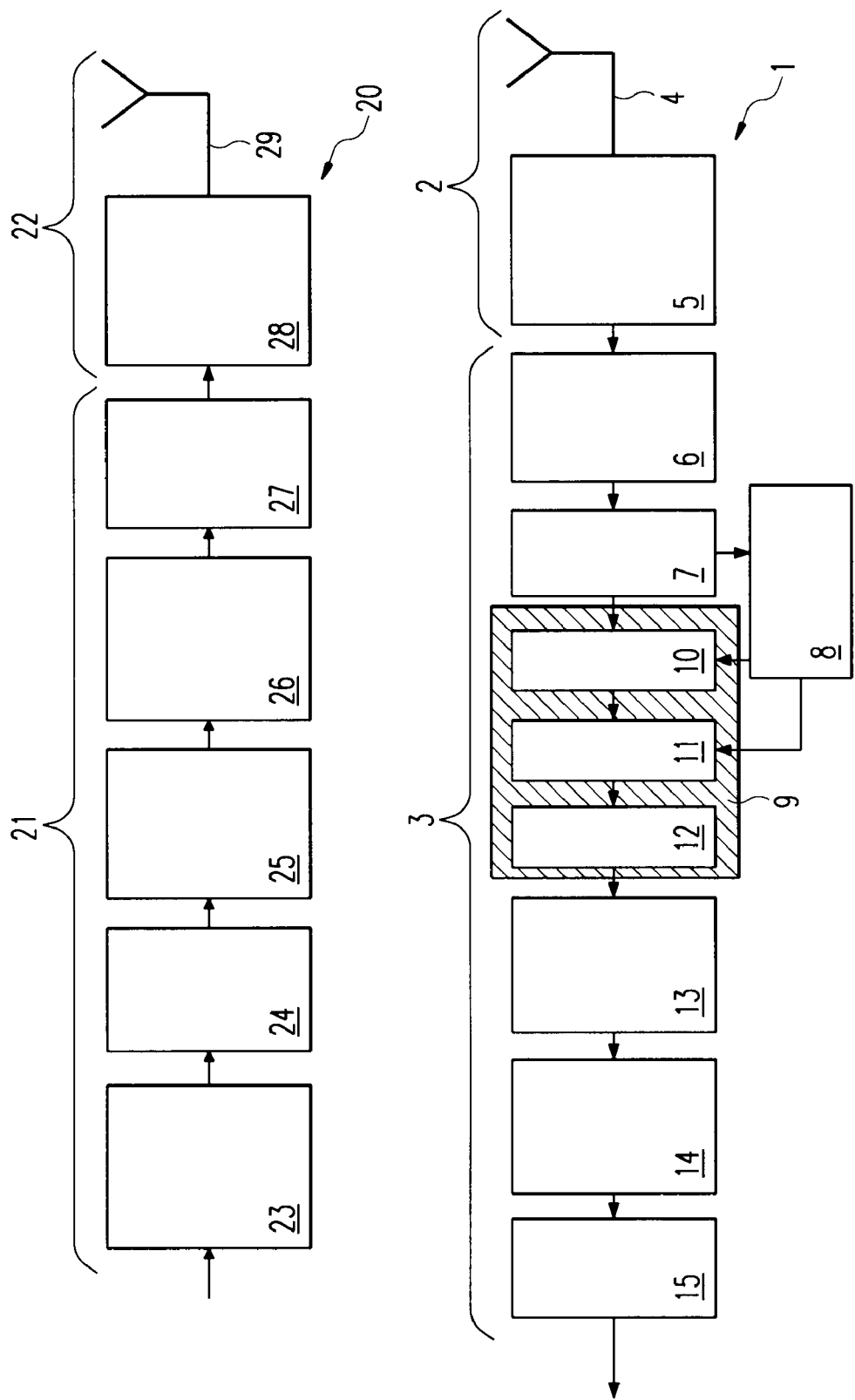
FIG. 1 shows a schematic representation of a first embodiment of the communication device according to the present invention.

FIG. 1 shows schematic representation of an example of an SC/FDE SISO communication system comprising a first embodiment of the receiver 1 according to the present invention and a transmitter 20.

The receiver 1 comprises a radio frequency (RF) part 2 and a baseband part 3. The RF part has an antenna 4 connected to a low noise amplifier/downconversion unit 5. A signal received by the antenna 4 is amplified and downconverted. The downconverted signal is forwarded to a filter 6 of the baseband circuit 3. After filtering, the signal is digitized using an analogue-to-digital converter (ADC) 7 and is provided to a channel estimator 8 and an FDE 9. Based on the digitized signal (e.g. based on a preamble section including training sequences) a channel estimation and synchronisation/timing information is obtained by the channel estimator 8. Signals from the channel estimator 8 are applied to an FDE 9. The FDE 9 comprises a fast Fourier transformator (FFT) 10 for transforming the digitized signal into the frequency domain. The transformed signal is then equalised by an equalizer 11, of which the constitution and operation will be described in detail later on. The equalised signal is then transformed back into the time domain by an inverse fast Fourier transformator (IFFT) 12 and provided to a demodulator 13, which may, but need not, be implemented as a soft demodulator. The demodulator 13 performs a demodulation operation (known also as 'symbol demapping') and may be implemented e.g. as a soft demodulator. After being deinterleaved by a deinterleaver 14, the signal is decoded (channel decoding) by a channel decoder 15 whereby received data is obtained which is put out as a bit stream.

The transmitter 20 comprises a baseband part 21 and an RF part 22. In the baseband part, a transmit data bit stream is encoded (channel encoding, e.g. based on a forward error correction code) by a channel encoder 23 and subsequently interleaved by an interleaver 24. A modulator 25 applies a modulation operation (known also as "symbol mapping" or "constellation mapping") to the interleaved data which is further converted into an analogue signal by a DAC 26 and filtered by a filter 27. The analogue, filtered signal is then forwarded to an upconversion/power amplifier unit 28 and the upconverted and amplified signal is emitted using an antenna 29.

Figure 2:
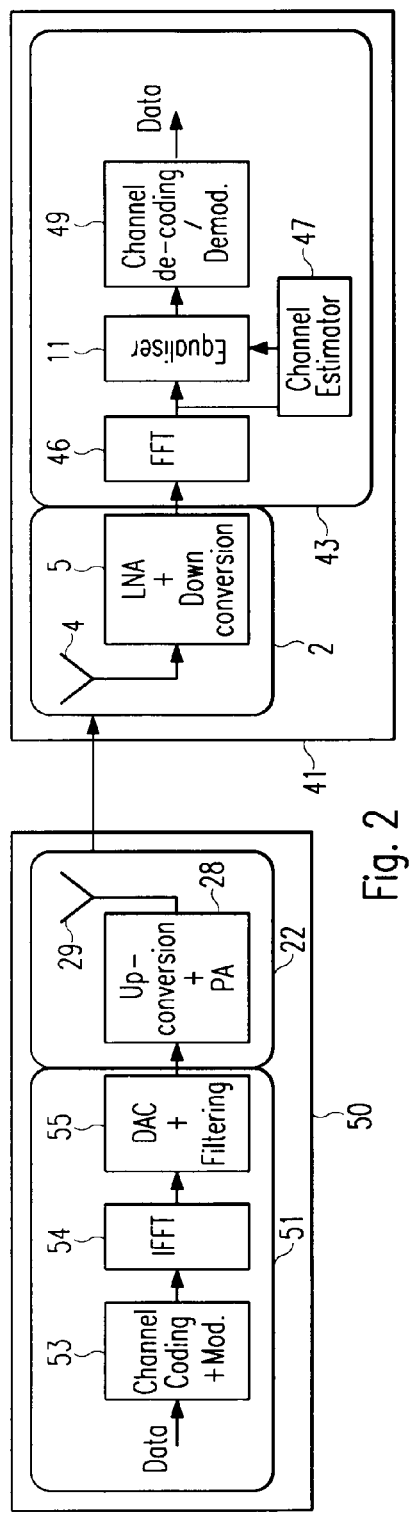
FIG. 2 shows a schematic representation of a second embodiment of the communication device according to the present invention.
Figure 3:
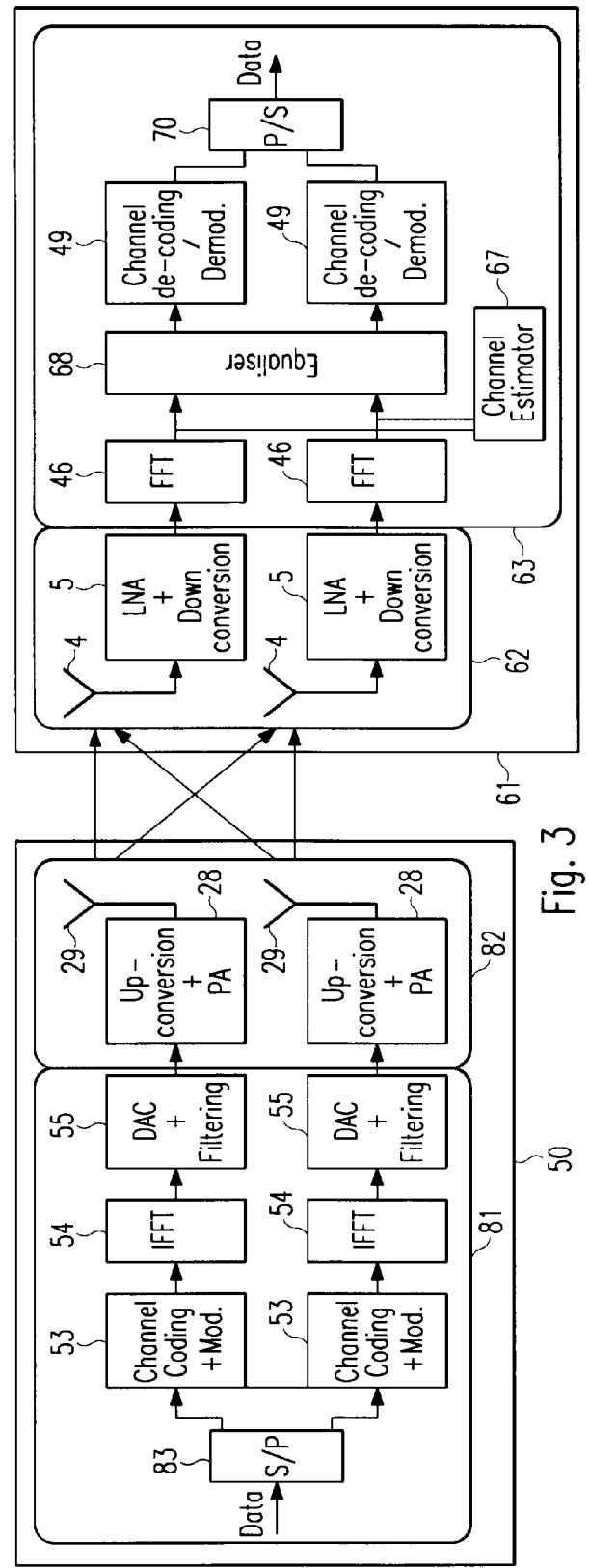
FIG. 3 shows a schematic representation of a third embodiment of the communication device according to the present invention.

It is stressed that the communication system shown in FIG. 1 and the communication systems that are described later on in relation with FIGS. 2 and 3 are just typical examples of communication systems for which the present invention might be employed. Not all of the elements shown in the Figures are essential, some elements might be replaced with other or modified elements, some elements might additionally be added and some elements might be reordered as is known in the art of communication systems.

FIG. 2 shows a schematic representation of an example of an OFDM communication system comprising a second embodiment of the receiver 41 of the present invention and a transmitter 50.

The receiver 41 comprises the RF part 2 and a baseband part 43. After downconversion in the RF part 2, a received signal is transformed by a fast Fourier transformator 46 and is provided to a channel estimator 47 and the equalizer 11 of the baseband part 43. Based on the signal (e.g. based on a preamble section including training sequences) a channel estimation and synchronisation/timing information is obtained by the channel estimator 47. A signal from the channel estimator 47 is applied to the equalizer 11, of which the configuration and the operation will be described in detail later on. The equalised signal is provided to a channel decoding/demodulating unit 49, which comprises the chain of demodulator 13, deinterleaver 14 and channel decoder 15 as described above, and from which the received data is put out as a bit stream.

The transmitter 50 comprises a baseband part 51 and the RF part 22. A transmit data bit stream is input in a channel coding/modulation unit 53 comprising the chain of channel coder 23, interleaver 24 and modulator 25 described above. The thus encoded data is transformed by an IFFT 54. The (inverse) Fourier transformed data is further processed by a DAC/filtering unit 55, comprising the chain of DAC 26 and filter 27 before it is emitted by the RF part 22.

Before the operation of the equalizer 11 is explained, the operation of a conventional single tap MMSE equalizer is described. This equalizer equalises the received signal by multiplying the received signal by a complex number g. In a multi-carrier system, like the one of FIG. 2 for example, a separate single tap equalizer is needed for each carrier or frequency l. Although the SC/FDE communication system of FIG. 1 is a single carrier communication system, the single carrier is split into a plurality of carriers or frequencies by virtue of and in between the FFT 10 and IFFT 12. Therefore, also in the SC/FDE system of FIG. 1 a separate single tap equalizer is needed for each carrier or frequency l obtained by means of the discrete Fourier transformation. The conventional equalizer for each frequency l is given by $$g_l = \frac{h_l^*}{|h_l|^2 + \sigma_{n,l}^2}, \quad (1)$$

whereby $h_l$ represents the channel response, an $\sigma_{n,l}^2$ represents the noise variance, * represents complex conjugation and |.| represents the absolute value. The channel response $h_l$ is determined by the channel estimator 8, 47 and corresponds to (or is at least part of) the channel estimation mentioned above. $|h_l|^2$ is the channel power and corresponds to the power ("signal power") of the received signal (without noise components). The noise variance corresponds to the power ("noise power") of noise in the received signal. There may be determined only one noise variance for all frequencies l. The noise variance is equivalent to the inverse value of the signal-to-noise ratio (SNR) ($\sigma_{n,l}^2 = 1/SNR_l$). As was described above, a LUT is used to determine the inverse of the divisor $|h_l|^2 + \sigma_{n,l}^2$ in order replace the division by a multiplication and reduce the complexity of calculation. However, because the dynamic range of $(|h_l|^2 + \sigma_{n,l}^2)^{-1}$ for a wide range of noise variance and channel powers can be very large, a big LUT is needed.

The present invention proposes new and inventive implementations of the MMSE equalization principle which reduces the size of the LUT and, generally, provides for a reduced complexity of the equalizer and receiver.

For the sake of brevity, the subscript l, denoting the carrier or frequency number, will be dropped in the following, but it must be understood that a separate equalizer is required and separate equalization is carried out for each carrier or frequency l also in case of the present invention.

According to the present invention, the equalizer has a plurality of equalizer structures. In the following, embodiments with two or three equalizer structures are provided. According to the present invention, an equalizer structure is selected depending upon a channel power value. Hereby, at least one threshold value is used. The channel power value is an element of a range of possible channel power values. The one or more threshold values divide (separate) the range of possible channel power values into at least two (sub-)ranges. The one or more threshold values correspond to boundaries of the subranges. To each subrange corresponds one equalizer structure.

TABLE 1

Three Structure MMSE Equaliser

| $|h|^2$ condition | Equaliser structure selected | LUT needed |
|---|---|---|
| if $|h|^2 <$ (lower limit × $\sigma_n^2$) | $g = h^* \times \dfrac{1}{\sigma_n^2}$ (2) | Yes |
| if (upper limit × $\sigma_n^2$) ≧ $|h|^2 ≧$ (lower limit × $\sigma_n^2$) | $g = \dfrac{h^*}{|h|^2 + \sigma_n^2}$ (3) | Yes |
| If $|h|^2 >$ (upper limit × $\sigma_n^2$) | $g = \dfrac{h^*}{|h|^2}$ (4) | Yes |

In Table 1, a three structure MMSE Equalizer according to a first embodiment of the equalizer according present invention is defined. The two threshold values (lower limit×$\sigma_n^2$) and (upper limit×$\sigma_n^2$) divide the possible range of channel power values $|h|^2$ into the three ranges $|h|^2 <$(lower limit×$\sigma_n^2$), (upper limit×$\sigma_n^2$)≧$|h|^2$≧(lower limit×$\sigma_n^2$) and $|h|^2 >$(upper limit×$\sigma_n^2$). In this first embodiment, a division operation is needed for each equalizer structure and, therefore, a LUT is required for each of the structures. The parameters lower limit and upper limit can be used to trade off performance with complexity.

An advantage of this three structure equalizer is that three smaller LUTs are needed rather than one large LUT.

When plotting the function y=1/x one sees that the graph is steep near the y-axis (x=0) and flat far from the y-axis. Thus, a small change in x amounts to a large variation in y when being close to the y-axis. Therefore, it is advantageous to provide LUTs with different quantization. A LUT has an input variable and an output variable. The LUT maps an input value to an output value. The input variable corresponds to the divisor of which the inverse value is to be looked-up. The inverse value corresponds to the output value. The term quantization as used in here refers to the quantization of the input variable. Of course, the quantization of the input variable influences the quantization (average step size) of the output variable. That is, a finer quantization of the input variable corresponds to a finer quantization (average step size) of the output variable. Advantageously, a LUT that corresponds to a smaller divisor has finer quantization (of the input variable) than a LUT that corresponds to a greater divisor. Hence, in the first embodiment of the equalizer 11, the LUT corresponding to equation (2) is quantized fine, the LUT corresponding to equation (4) is quantized coarse and the LUT corresponding to equation (3) has a quantization in between (middle quantization).

The number and size of the LUTs can be further reduced by setting $\sigma_n^2$ to a fixed value denoted by NP. The fixed value may be chosen to be the minimum value, $\sigma_{n,min}^2$, of the noise variance, that will presumably be encountered when operating the equalizer/receiver according to the present invention. This is equivalent to saying that the fixed value may be chosen to be the inverse of the maximum value, $SNR_{max}$, of the SNR that will presumably be encountered during the operation of the equalizer/receiver according to the present invention. Thus, for example, $NP=\sigma_{n,min}^2=1/SNR_{max}$. The fixed value NP may be determined at the stage of development of the equalizer 11 or receiver 1, 41 and be preset (stored) in the equalizer 11 during production. Because, in this case, $\sigma_n^2$ has not to be determined by the receiver 1, 41, the complexity of the receiver is reduced so that it can be produced at lower cost. At the time of the determination and storage of the fixed value NP also its inverse INP=1/NP may be determined and stored. Alternatively, the inverse value INP may be calculated from NP e.g. at start up or in an initialisation phase. Alternatively, INP may be stored and NP may be calculated from it. Applying this to the first embodiment, a second embodiment of the equalizer according to the present invention, corresponding to a sub-optimal three structure MMSE equalizer, is obtained. The suboptimal three structure MMSE equalizer is summarized in the following Table 2.

TABLE 2

Three Structure suboptimal MMSE equaliser

| $|h|^2$ condition | Equaliser structure selected | LUT needed |
|---|---|---|
| if $|h|^2 <$ (lower limit × NP) | $g = h^* \times INP$ (5) | no |
| if (upper limit × NP) $\geq$ $|h|^2 \geq$ (lower limit × NP) | $g = \dfrac{h^*}{|h|^2 + NP}$ (6) | Yes |
| if $|h|^2 >$ (upper limit × NP) | $g = \dfrac{h^*}{|h|^2}$ (7) | Yes |

In this second embodiment of the equalizer 11, for the equalizing structure described by equation (5) no division operation is needed and therefore no LUT is necessary. Furthermore, since NP is fixed, the dynamic range of the LUT needed for the evaluation of equation (6) is lower than the dynamic range of the LUT needed for the evaluation of equation (3), so the size of the LUT is reduced. Advantageously, the LUT used for evaluating the equation (6) has a different (finer) quantization than the LUT used for evaluating the equation (7).

For some applications it may be beneficial to merge the LUT tables needed for equations (6) and (7). This alternative two structure approach, corresponding to a third embodiment of the equalizer according to the present invention, is defined in the following Table 3.

TABLE 3

Two structure suboptimal MMSE equaliser

| $|h|^2$ condition | Equaliser structure selected | LUT needed |
|---|---|---|
| if $|h|^2 <$ (lower limit × NP) | $g = h^* \times INP$ (8) | no |
| if $|h|^2 \geq$ (lower limit × NP) | $g = \dfrac{h^*}{|h|^2 + NP}$ (9) | Yes |

The concepts described above can also be extended to MIMO, SIMO and MISO systems (MISO, SIMO and SISO systems may be seen as special cases of a general MIMO system). FIG. 3 shows an example of an OFDM MIMO system with two transmit paths (transmitter antennas) and two receive paths (receiver antennas). Generalisation to more than two transmit and/or receive paths is obvious. The communication system comprises a receiver 61 corresponding to a second embodiment of the receiver according to the present invention and a transmitter 80.

The receiver 61 comprises an RF part 62 and a baseband part 63. The RF part 62 comprises two parallel RF parts 2 (as shown in FIG. 1 and 2) each comprising an antenna 4 and a low noise amplifier/down conversion unit 5. Two simultaneously received and parallely processed signals are provided in parallel to two FFTs 46 of the baseband part 63. After being Fourier transformed in the FFTs 46, each signal is provided to a channel estimator 67 and an equalizer 68. Based on the signals (e.g. based on a preamble section including training sequences) a channel estimation and synchronisation/timing information is obtained by the channel estimator 67. A signal from the channel estimator 67 is applied to the equalizer 68, of which the configuration and the operation will be described in detail later on. The equalization process in the equalizer 68 will generally "mix" the parallel input signals into parallel output signals, each of which is then provided to a corresponding demodulation/channel decoding unit 49. The plurality of units 49 generate a corresponding plurality of bit streams which are serialized by a parallel-to-serial converter (P/S) 70 and put out as an output data bit stream.

The transmitter 80 comprises a baseband part 81 and an RF part 82. An input data bit stream is split into two parallel data streams by a serial-to-parallel converter 83 of the baseband part 83. Each data stream is processed by a corresponding chain of a channel coding/modulation unit 53, IFFT 54, DAC/filtering unit 55 and up-conversion/PA unit 28 and, finally, is emitted (as a signal) by a corresponding antenna 29.

A conventional MMSE equalizer for a MIMO system with $n_R=1, 2, 3, \ldots$ receive paths (e.g. receive antennas) and $n_T=1, 2, 3, \ldots$ transmit paths (e.g. transmit antennas) (for true MIMO $n_R$, $n_T \geq 2$ holds) multiplies the equalizer matrix G (of size $n_R \times n_T$) by the received symbol vector r (of size $n_R \times 1$) for each carrier or frequency l. The equalizer matrix G is given by $$G=(H^H H + \sigma_n^2 I)^{-1} H^H, \quad (10)$$

where H is a $n_R \times n_T$ matrix whose elements represent the channel response from the different transmit paths to the different receive paths, I is the $n_T \times n_T$ identity matrix, $\sigma_n^2$ represents the noise variance, $(\bullet)^H$ denotes the Hermitian transpose and $(\bullet)^{-1}$ denotes the inverse (inverse matrix). The channel matrix H (one for each carrier or frequency l) is determined by the channel estimator 67 as (at least part of) the channel estimation. $H^H H$ is a $n_T \times n_T$ channel power matrix $H^H H$ having elements corresponding to channel powers.

A two structure MIMO MMSE equalizer, corresponding to a fourth embodiment of equalizer according to the present invention, is defined in the following Table 4.

TABLE 4

Two structure MIMO MMSE equaliser

| $H^H H$ condition | Equaliser structure selected | LUT needed | Matrix inv. |
|---|---|---|---|
| if all elements of $H^H H <$ (lower limit $\times \sigma_n^2$) | $G = \left(\dfrac{1}{\sigma_n^2}\right) \times I\, H^H$ (11) | Yes | No |
| Otherwise | $G = (H^H H + \sigma_n^2 I)^{-1} H^H$ (12) | No | Yes |

In the fourth embodiment, when all elements (channel powers) of the channel power matrix $H^H H$ are lower than lower limit$\times \sigma_n^2$ (e.g. lower than $\frac{1}{5} \times \sigma_n^2$), the structure according to equation (11) is selected. This is equivalent to saying that, when the largest element of the channel power matrix is smaller than lower limit$\times \sigma_n^2$, the structure according to equation (11) is selected. For the evaluation of equation (11) only a LUT (for determining the inverse of $\sigma_n^2$) but no matrix inversion is required. Forming the inverse matrix is a computationally very complex operation. Therefore a big advantage is gained.

A further reduction in complexity is obtained by using the suboptimal MMSE approach described above. A two structure suboptimal MMSE MIMO equalizer, corresponding to a fifth embodiment of the equalizer according to the present invention, is defined the following Table 5.

TABLE 5

Two structure suboptimal MMSE MIMO equaliser

| $H^H H$ condition | Equaliser structure selected | LUT needed | Matrix inv. |
|---|---|---|---|
| if all elements of $H^H H <$ (lower limit $\times$ NP) | $G = INP \times I\, H^H$ (13) | No | No |
| Otherwise | $G = (H^H H + NP \times I)^{-1} H^H$ (14) | No | Yes |

In this embodiment, there is neither required a matrix inversion nor a LUT for the evaluation of the equation (13).

Figure 4:
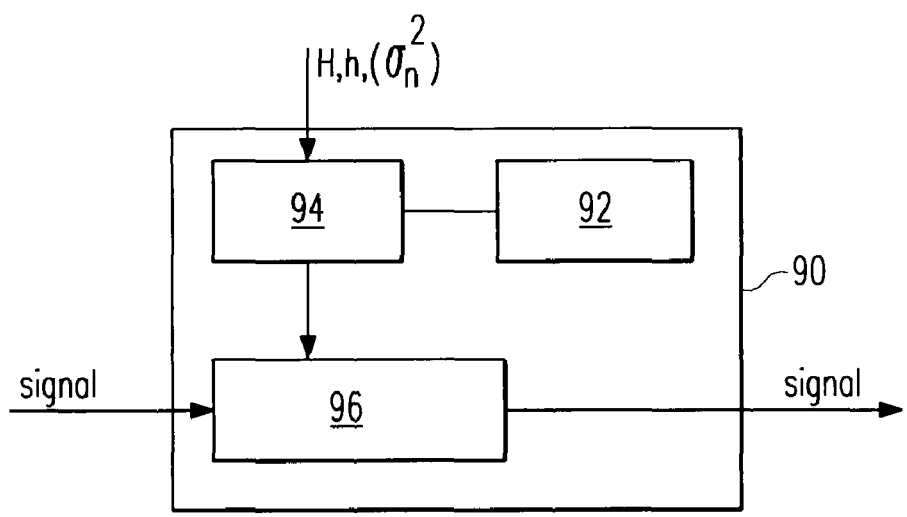
FIG. 4 shows a schematic representation of an embodiment of the equalizer according to the present invention.

FIG. 4 shows a schematic diagram of an equalizer 90 which applies to any one of the first to fifth embodiment of the equalizer according to the present invention. The equalizer 90 comprises a memory 92 in which at least some of the following information items are stored: NP, INP, lower limit, upper limit, lower limit×NP, upper limit×NP, one or more look-up tables. (Which items are stored depends on which of the first to fifth embodiments is implemented and is evident from the above description). The equalizer 90 further comprises a filter calculator 94 which has access to the memory. The filter calculator 94 receives the channel estimation (h or H) and, eventually, $\sigma_n^2$ selects the filter structures according to the above defined conditions and calculates the filter (filter is described in terms of filter information g or G) to be applied to the received signal in accordance with the selected equalizer structure. The equalizer 90 further comprises a filter 96 which filters (performs the actual equalization processing) the received one or more signals according to the filter information and puts out the filtered (equalised) one or more signals. As noted above, this processing is repeated for each carrier or frequency l using the parameters/input/channel estimation corresponding to the subcarrier or frequency l. At least some of the NP, INP, lower limit, upper limit, lower limit×NP, and upper limit×NP may be frequency dependent.

Figure 5:
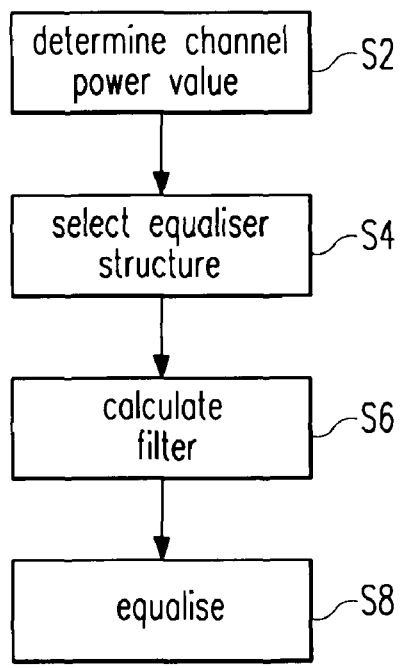
FIG. 5 shows a schematic representation of an embodiment of the communication method according to the present invention.

The present invention can likewise be seen in a corresponding method of equalizing 30 one or more received signals. FIG. 5 shows a schematic diagram of an embodiment of the method of equalizing one or more received signals.

In step S2 a channel power value is determined based on one or more channel response values.

In a step S4, one of two or more equalizer structures is selected based on the channel power value. At least one of said equalizer structures corresponds to a minimum mean square error equalizer structure or a suboptimal minimum mean square error equalizer structure. In case the channel power value is below a first threshold, a first equalizer structure is selected in step S4 and in case the channel power value above said first threshold a second equalizer structure is selected in step S4.

In a step S6, a filter (i.e. filter defining information) is calculated according to the selected equalizer structure based on channel state information.

In a step S8, one or more received signals are filtered (equalised) according to the calculated filter. Since in step S6 the filter is calculated according to the selected equalizer structure, the one or more received signals are equalised according to the selected equalizer structure.

The steps of the method are carried out according to the principles described above in relation with said first to third embodiment of the communication device and said first to fifth embodiment of the equalizer.

The present invention has been described with reference to an OFDM multi-carrier communication system. The present invention, may however also be employed in relation with other MC communication techniques and variants of OFDM including, as a non limiting example, multi-carrier code division multiple access (CDMA), wavelet based multi-carrier techniques, OFDM-CDMA and other combinations and variations thereof.

The present invention has been described based on embodiments using single tap equalizers. Multiple tap equalizers however suffer from the same problems of high computational complexity due to divisions and matrix inversions (even a plurality of divisions and matrix inversions has to be carried out). Therefore, the present invention may be equally applied to multiple tap equalizers. For example, a multi tap SC/TDE equalizer/receiver may be realized using the present invention.

To implement the conventional MMSE equalizer, an estimate of the SNR is required. Using the suboptimal approach described above in relation with the second, third and fifth embodiment of the equalizer according to the present invention, only the communication channel has to be estimated but no estimate of the SNR is required, so that a SNR evaluation circuit/algorithm can be dispensed with.

It is noted, that for some receiver implementations (e.g. some OFDM receiver implementations) the division operations of equations 1-4, 6, 7, 9 and 11 can be performed as in internal scaling in the demodulator (e.g. the demodulator 13, 49) and, therefore, can be ignored in the equalizer block. In this case, the division operations performed in the demodulator can be implemented using a LUT in the same way as if they had been implemented in the equalizer. Such splitting of equalizer processing between the equalizer block and the demodulator is however not possible for an SC/FDE receiver (like e.g. the receiver 1 depicted in FIG. 1), since the equalization and the demodulation are performed in different domains. It must be understood that the equalizer according to the present invention may be seen as comprising the demodulator performing the internal scaling (or at least the relevant portion thereof).

It is noted that each of the receivers 1, 41, 61 can, for example, be part of a pure receiving device or can be part of a receiving and transmitting device. In the later case, the antenna 4 can be a receiving as well as a transmitting antenna. Also, each of the transmitters 20, 50, 80 can be part of a pure transmitting device or can be part of a transmitting and receiving device (e.g. said receiving and transmitting device). In the latter case, the antenna 29 may be a transmitting and receiving antenna (e.g. the antennas 4 and 29 may be the same entity).

The invention claimed is:

1. An equalizer for a communication device, comprising:
a filter calculator for determining a channel power value based on one or more channel response values and selecting one of two or more equalizer structures based on said channel power value and based on at least one threshold value for classifying said channel power value in one of at least two ranges, said filter calculator adapted to select a first equalizer structure when said channel power value is below a first threshold value and select a second equalizing structure when said channel power value is above said first threshold value; and
a filter for equalizing one or more received signals according to the selected equalizer structure,
wherein said filter calculator, in accordance with said first equalizer structure, is adapted to calculate a first product of a conjugate complex of the one or more channel response values with an inverse value of a noise variance value, when said first equalizer structure is selected.

2. The equalizer according to claim 1, wherein said filter calculator, in accordance with said second equalizer structure, is adapted to calculate a second product of a conjugate complex of the one or more channel response values with an inverse value of the sum of said channel power value and said noise variance value.

3. The equalizer according to claim 2, wherein said filter calculator is adapted to calculate said first product based on a first look-up table and said second product based on a second look-up table, said first and second look-up tables having different quantizations.

4. The equalizer according to claim 1, further comprising:
a memory for storing a predetermined value, wherein said filter calculator, in accordance with said first equalizer structure, is adapted to calculate a first product of the conjugate complex of a channel response value with either said predetermined value or the inverse value of said predetermined value.

5. The equalizer according to claim 4, wherein said filter calculator, in accordance with said second equalizer structure, is adapted to calculate the sum of said channel power value with either said predetermined value or the inverse of said predetermined value and to calculate a second product of the conjugate complex of a channel response value with the inverse of said sum.

6. The equalizer according to claim 1, wherein said filter calculator is adapted to
select a third equalizer structure when said channel power value is above a second threshold value that is larger than said first threshold value; and to
select said second filter structure when said channel power value is above said first threshold value and below said second threshold value.

7. The equalizer according to claim 6, wherein said filter calculator, in accordance with said third equalizer structure, is adapted to calculate a third product of the conjugate complex of a channel response value with the inverse value of said channel power value based on a look-up table.

8. The equalizer according to claim 1, wherein said channel power value is the largest element of a channel power matrix.

9. The equalizer according to claim 8, wherein said filter calculator is adapted to calculate said channel power matrix by multiplying the Hermitian transpose of a channel matrix with the channel matrix, whereby said channel matrix comprises said one or more channel response values.

10. The equalizer according to claim 9, wherein said filter calculator, in accordance with said first equalizer structure, is adapted to calculate a first matrix corresponding to the Hermitian transpose of said channel matrix multiplied by the inverse of a noise variance value.

11. The equalizer according to claim 10, wherein said filter calculator is adapted to calculate the inverse value of said noise variance value using a look-up table.

12. The equalizer according to claim 9, further comprising:
a memory for storing a predetermined value; wherein said filter calculator, in accordance with said first equalizer structure, is adapted to calculate a first filter matrix corresponding to the Hermitian transpose of said channel matrix multiplied by either said predetermined value or the inverse of said predetermined value.

13. The equalizer according to claim 12, wherein said filter calculator, in accordance with said second equalizer structure, is adapted to calculate a second matrix corresponding to a conventional minimum mean square error equalizer matrix whereby the value of a noise power parameter required for calculating said second filter matrix is set to said predetermined value.

14. The equalizer according to claim 1, further comprising
at least two look-up tables for implementing corresponding at least two division or inversion operations, said at least two look-up tables having a different quantization.

15. The equalizer according to claim 14, wherein each of said division or inversion operations corresponds to a different one of said equalizer structures.

16. The equalizer according to any one of claims 2, 10 and 11, wherein
said first threshold value is given by the product of a first factor with said noise variance value.

17. The equalizer according to claim 1, wherein at least one of said two or more equalizer structures corresponds to an, at least approximated, minimum mean square error equalizer structure or to an, at least approximated, suboptimal minimum mean square error equalizer structure.

18. A communication device comprising the equalizer according to claim 1.

19. A method of equalizing one or more received signals comprising
the steps of
determining a channel power value based on one or more channel response values;
selecting one of two or more equalizer structures based on said channel power value; and
equalizing said one or more received signals according to the selected equalizer structure, wherein
at least one of said equalizer structures corresponds to an, at least approximated, minimum mean square error equalizer structure or to an, at least approximated, sub-optimal minimum mean square error equalizer structure,
a first equalizer structure is selected when said channel power value is below a first threshold,
a second equalizer structure is selected when said channel power value above said second threshold, and
calculating, by a filter calculator, a first product of a conjugate complex of the one or more channel response values with an inverse value of a noise variance value when said first equalizer structure is selected.

20. A non-transitory computer-readable storage medium having computer readable program codes embodied in the computer readable storage medium that, when executed cause a computer to execute:
determining a channel power value based on one or more channel response values;
selecting one of two or more equalizer structures based on said channel power value; and
equalizing said one or more received signals according to the selected equalizer structure, wherein
at least one of said equalizer structures corresponds to an, at least approximated, minimum mean square error equalizer structure or to an, at least approximated, sub-optimal minimum mean square error equalizer structure,
a first equalizer structure is selected when said channel power value is below a first threshold,
a second equalizer structure is selected when said channel power value above said second threshold, and
calculating, by a filter calculator, a first product of a conjugate complex of the one or more channel response values with an inverse value of a noise variance value when said first equalizer structure is selected.

21. An equalizer for a communication device, comprising:
a filter calculator for determining a single channel power value based on one or more channel response values and selecting one of two or more equalizer structures based on said single channel power value and based on at least one threshold value for classifying said single channel power value in one of at least two ranges; and
a filter for equalizing one or more received signals according to the selected equalizer structure,
wherein said filter calculator selects a first equalizer structure when said single channel power value is below a first threshold value and selects a second equalizer structure when said single channel power value is above said first threshold value, and
wherein said filter calculator calculates a first product of a conjugate complex of the one or more channel response values with an inverse value of a noise variance value when said first equalizer structure is selected.

22. The equalizer according to claim 21, wherein said filter calculator calculates a second product of a conjugate complex of the one or more channel response values with an inverse value of the sum of said single channel power value and said noise variance value when said second equalizer structure is selected.

* * * * *